US012675812B2

(12) United States Patent
Bruer et al.

(10) Patent No.: US 12,675,812 B2
(45) Date of Patent: Jul. 7, 2026

(54) MULTI-ITEM SEARCH

(71) Applicant: Walmart Apollo, LLC, Bentonville, AR (US)

(72) Inventors: Matthew Christopher Bruer, Seattle, WA (US); Philip Douglass Willcox, Brooklyn, NY (US); Rumit Jayantkumar Patel, Edison, NJ (US); Wayne Anthony Ledgister, Jersey City, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 21 days.

(21) Appl. No.: 18/830,875

(22) Filed: Sep. 11, 2024

(65) Prior Publication Data

US 2025/0131483 A1 Apr. 24, 2025

Related U.S. Application Data

(60) Provisional application No. 63/591,286, filed on Oct. 18, 2023.

(51) Int. Cl.
*G06Q 30/0601* (2023.01)
*G06N 20/20* (2019.01)
*H04L 51/02* (2022.01)

(52) U.S. Cl.
CPC ......... *G06Q 30/0627* (2013.01); *G06N 20/20* (2019.01); *G06Q 30/0603* (2013.01); *G06Q 30/0643* (2013.01); *H04L 51/02* (2013.01)

(58) Field of Classification Search
CPC ........... G06Q 30/0627; G06Q 30/0603; G06Q 30/0643; G06Q 30/0207–30/0277; G06Q 30/0247; G06Q 30/0269; G06Q 50/01; G06N 20/20; G06N 3/045; H04L 51/02; H04L 67/20; H04L 67/306

See application file for complete search history.

(56) References Cited

U.S. PATENT DOCUMENTS

| | | | |
|---|---|---|---|
| 10,366,442 B1 | 7/2019 | Oczkowski et al. | |
| 10,776,408 B2 * | 9/2020 | Altaf ...................... | G06F 16/36 |
| 10,878,809 B2 * | 12/2020 | Gruber ................... | G10L 15/28 |

(Continued)

OTHER PUBLICATIONS

E-commerce_Product_Query_Classification_Using_Implicit_Users_Feedback_from_Clicks (Year: 2018).*

(Continued)

*Primary Examiner* — Gautam Ubale
(74) *Attorney, Agent, or Firm* — Morgan, Lewis & Bockius LLP; Manita Rawat

(57) ABSTRACT

Systems and methods for multi-item searching for limited-channel interfaces are disclosed. In some embodiments, a disclosed method includes: receiving an input message from a requesting device via a limited-communication channel; identifying, via a first trained natural language model, a plurality of queries in the input message; implementing a plurality of search threads, wherein each of the plurality of search threads is configured to generate search results for a corresponding one of the plurality of queries; generating a responsive message comprising at least a portion of the search results for each of the corresponding one of the plurality of queries; and transmitting the responsive message to the requesting device.

20 Claims, 11 Drawing Sheets

(56) References Cited

U.S. PATENT DOCUMENTS

| | | | | |
|---|---|---|---|---|
| 10,929,917 | B2 | 2/2021 | Venkatakrishnan et al. | |
| 11,182,381 | B2 * | 11/2021 | Tunstall-Pedoe | G06F 16/24 |
| 11,854,544 | B1 * | 12/2023 | Weiss | G10L 15/183 |
| 12,236,471 | B2 | 2/2025 | Isaacson et al. | |
| 2017/0243107 | A1 * | 8/2017 | Jolley | G06N 5/02 |
| 2018/0096025 | A1 * | 4/2018 | Tunstall-Pedoe | G06F 16/24 |
| 2020/0043482 | A1 * | 2/2020 | Gruber | G10L 15/26 |
| 2020/0143115 | A1 * | 5/2020 | Brigham | G06N 3/006 |
| 2021/0090154 | A1 * | 3/2021 | Michaelson | G06F 40/30 |
| 2021/0097063 | A1 * | 4/2021 | Wan | G06N 3/0442 |
| 2022/0197900 | A1 * | 6/2022 | Maheshwari | G06N 3/09 |
| 2022/0318501 | A1 * | 10/2022 | Alexander | G06F 40/30 |
| 2023/0135703 | A1 * | 5/2023 | Weil | H04L 67/535 |
| | | | | 705/26.7 |
| 2023/0252497 | A1 * | 8/2023 | Young | G06Q 30/0201 |
| 2024/0289861 | A1 * | 8/2024 | Wang | G06Q 30/0631 |
| 2024/0303711 | A1 * | 9/2024 | Tan | G06Q 30/0635 |
| 2024/0311891 | A1 * | 9/2024 | Clark | G06Q 30/0643 |
| 2024/0331003 | A1 * | 10/2024 | Saad | G06Q 30/0627 |
| 2024/0354309 | A1 * | 10/2024 | Sacheti | G06F 16/2455 |
| 2024/0362286 | A1 * | 10/2024 | He | G06F 16/93 |
| 2025/0021767 | A1 * | 1/2025 | Dharnidharka | G06F 16/90332 |
| 2025/0131487 | A1 * | 4/2025 | Bruer | G06Q 30/0633 |

OTHER PUBLICATIONS

Keyword Search over Dynamic Categorized Information (Year: 2009).*

Building Intelligent Chatbots_ Tools, Technologies, and Approaches (Year: 2023).*

Pretrained Transformers for Text Ranking BERT and Beyond (Year: 2021).*

S. Sharma, "Turning Handwritten Notes into a Pre-filled Cart," Medium, Oct. 30, 2024, 13 pages.

A. Thakur, "Swiggy Instamart Launches "Shopping List" Feature After X User's Feedback," Offbeat, Oct. 27, 2024, 3 pages.

Streebo, Inc., "How Al-Powered Customer Service Bots Simplify Grocery Shopping Experience?," (Year: 2025), 10 pages.

* cited by examiner

200

Receive Input Message via Limited Channel    202

Identify Requested Operation    204

Identify Plurality of Queries in Input Message    206

Generate and Transmit Confirmation Message    208

Generate Channel-Limited Search Results    210

Generate and Transmit Responsive Message    212

Receive Feedback Data    214

Perform one or more Additional Operations    216

Update Model(s) Based on Feedback Data    218

300

Receive Two or More Queries          302

Generate Initial Search Result Set(s)          304

Generate Filtered Result Set(s)          306

Generate Query-Specific Search Result Set(s)          308

500

Receive Training Dataset
502

Process and Normalize Training Dataset
504

Execute Iterative Training Process
506

Receive Modified Output
508

Training Complete?
510

No

Yes

Output Trained Model
512

Evaluate Trained Model
514

MULTI-ITEM SEARCH

CROSS-REFERENCE TO RELATED APPLICATION

This application claims benefit to U.S. Provisional Application Ser. No. 63/591,286, entitled "SYSTEMS AND METHODS FOR MULTI-ITEM SEARCH," filed on Oct. 18, 2023, the disclosure of which is incorporated herein by reference in its entirety.

TECHNICAL FIELD

This application relates generally to limited-channel interfaces, and more particularly, to multi-item searching for limited-channel interfaces.

BACKGROUND

Text-based interfaces allow interactions between user systems and network resources using communication channels and systems that provide limited interactions. For example, short message/messaging service (SMS)-based text interfaces allow user systems to interact with network resources using SMS messaging, which may be limited to 140 8-bit characters, such as 8-bit alphanumeric data. The limited nature of SMS (and other text-only interfaces) places constraints on input, output, and interface presentations for interactions, such as search interactions.

Some current text-based interfaces allow a user to search for items or elements in a catalog associated with a network interface. Such systems receive individual, limited messages indicating a type of operation (e.g., search) and one or more parameters related to the operation (e.g., search terms) and perform individual operations in response to the limited messages. Such systems can be burdensome when multiple operations (e.g., multiple search operations for different parameters) need to be performed, as each operation must be input as an individual message, processed as an individual operation, and responded to with an individual message.

BRIEF DESCRIPTION OF THE DRAWINGS

The features and advantages of the present disclosure will be more fully disclosed in, or rendered obvious by the following detailed description of the example embodiments, which are to be considered together with the accompanying drawings wherein like numbers refer to like parts and further wherein.

DETAILED DESCRIPTION

Figure 1:
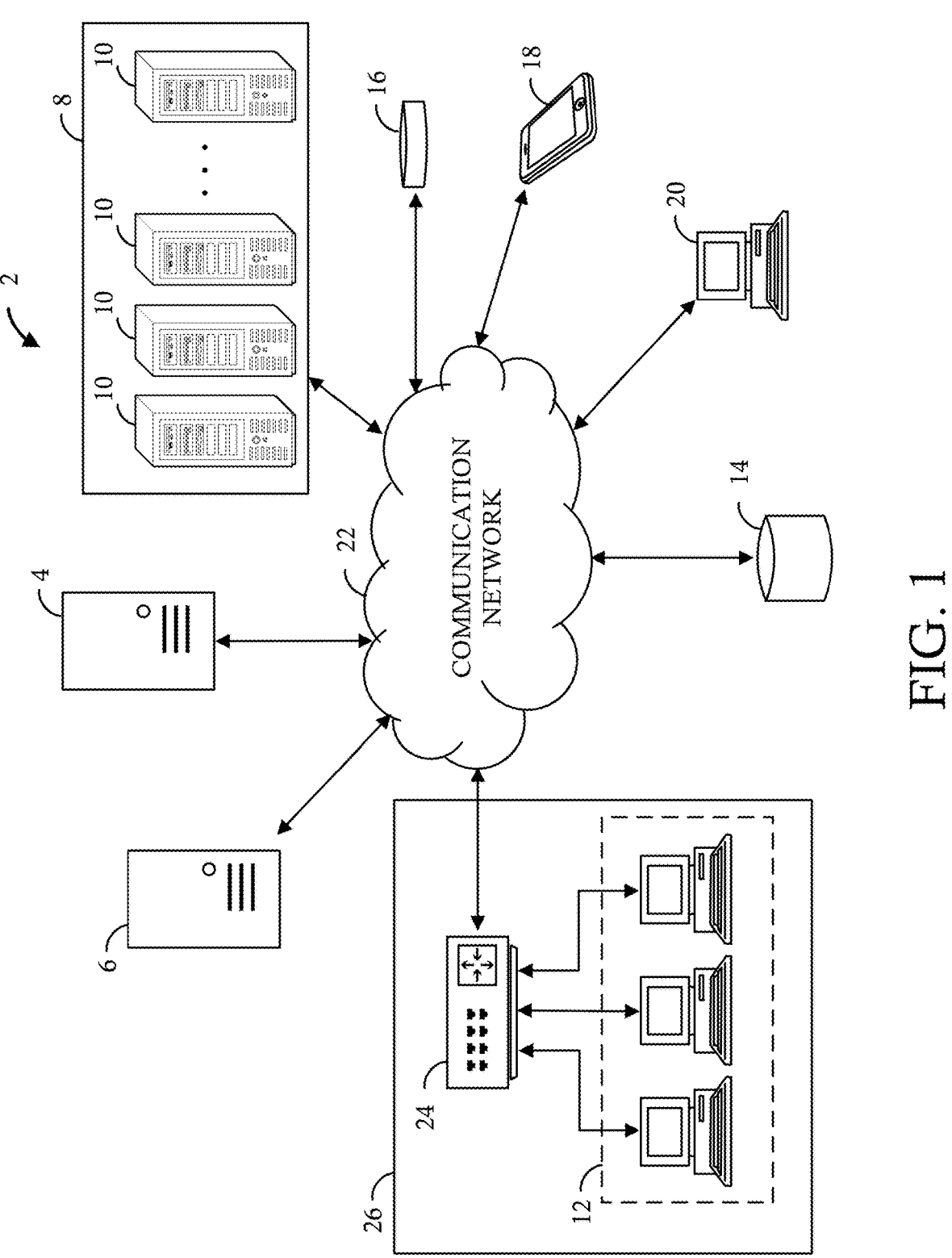
FIG. 1 illustrates a network environment configured to provide a limited, text-based interface including multi-item search, in accordance with some embodiments.

This description of the example embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these example embodiments in connection with the accompanying drawings.

In various embodiments, a system including a non-transitory memory and a processor communicatively coupled to the non-transitory memory is disclosed. The processor is configured to read a set of instructions to receive an input message from a requesting device via a limited-communication channel, identify, via a first trained natural language model, a plurality of queries in the input message, and implement a plurality of search threads. Each of the plurality of search threads is configured to generate search results for a corresponding one of the plurality of queries and is executed in parallel. The processor is further configured to read the set of instructions to generate a responsive message including at least a portion of the search results for each of the corresponding one of the plurality of queries and transmit the responsive message to the requesting device.

In various embodiments, a computer-implemented method is disclosed. The computer-implemented method comprises steps of receiving an input message from a requesting device via a limited-communication channel, identifying, via a first trained natural language model, a plurality of queries in the input message, and implementing a plurality of search threads. Each of the plurality of search threads is configured to generate search results for a corresponding one of the plurality of queries and is executed in parallel. The computer-implemented method further includes steps of generating a responsive message including at least a portion of the search results for each of the corresponding one of the plurality of queries and transmitting the responsive message to the requesting device.

In various embodiments, a non-transitory computer readable medium having instructions stored thereon is disclosed. The instructions, when executed by at least one processor, cause at least one device to perform operations including receiving an input message from a requesting device via a limited-communication channel, identifying, via a first trained natural language model, a plurality of queries in the input message, and implementing a plurality of search threads. Each of the plurality of search threads is configured to generate search results for a corresponding one of the plurality of queries and is executed in parallel. The device is further configured to perform operations including generating a responsive message including at least a portion of the search results for each of the corresponding one of the plurality of queries and transmitting the responsive message to the requesting device.

Furthermore, in the following, various embodiments are described with respect to methods and systems for limited-channel multi-item search. In various embodiments, a limited-channel input is received via a limited communications channel. The limited-channel input includes at least two sets of item search parameters (e.g., item names, item parameters, etc.) and may include a search operation indicator. The sets of item search parameters may be separated by one of a plurality of separation characters. The text-based input is received by a multi-item search engine configured to parse the text-based input to identify each set of item search parameters and execute a search for each set of search parameters. A result set is selected for each set of search parameters and a combined response is generated. The combined response includes elements related to each of the executed searches such as, for example, the result set for each set of search parameters. The combined response is transmitted to a requesting device via the limited communications channel and in a format suitable for use in conjunction with the limited communications channel.

In some embodiments, systems, and methods for multi-item search include one or more trained machine learning models, such as, for example, one or more trained natural language processing models and/or one or more trained search models. The trained natural language processing models may include one or more models, such as, for example, a bidirectional encoder representations from transformers (BERT) model, a Robustly Optimized BERT Pre-training Approach (ROBERTa) model, a large language model (e.g., GPT), etc. The trained search models may include one or more models, such as, for example, a regression model, XGBoost, LamdaMART, etc.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, a trained function may include a neural network, a support vector machine, a decision tree, a Bayesian network, a clustering network, Qlearning, genetic algorithms and/or association rules, and/or any other suitable artificial intelligence architecture. In some embodiments, a neural network may be a deep neural network, a convolutional neural network, a convolutional deep neural network, etc. Furthermore, a neural network may be an adversarial network, a deep adversarial network, a generative adversarial network, etc.

In various embodiments, neural networks which are trained (e.g., configured or adapted) to generate multi-search combined responses, are disclosed. A neural network trained to generate process text-based inputs and/or generate text-based responses may be referred to as a trained language model. A trained language model may be configured to receive a set of input data, such as a text-based input, parse the text-based input to identify operation indicators and/or sets of parameters in the text-based input. A trained language model may additionally and/or alternatively be configured to receive a set of input data, such as two or more sets of search results, and generate a text-based combined response incorporating at least a portion of the input data into a text-based natural language response.

FIG. 1 illustrates a network environment 2 configured to provide multi-item search, in accordance with some embodiments. The network environment 2 includes a plurality of devices or systems configured to communicate over one or more network channels, illustrated as a network cloud 22. For example, in various embodiments, the network environment 2 may include, but is not limited to, a responsive interface computing device 4, a communication server 6, a cloud-based engine 8 including one or more processing devices 10, workstation(s) 12, a database 14, and/or one or more user computing devices 16, 18, 20 operatively coupled over the network 22. the responsive interface computing device 4, the communication server 6, the processing device(s) 10, the workstation(s) 12, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the responsive interface computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the responsive interface computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the communication server 6 enables a limited interoperation interface via a limited communication channel, such as an SMS-based interface. In some embodiments, the responsive interface computing device 4, the processing devices 10, and/or the communication server 6 are operated by the network environment provider, and the user computing devices 16, 18, 20 are operated by users of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the responsive interface computing device 4, for example. The workstation(s) 12 may communicate with the responsive interface computing device 4 over the communication network 22. The workstation(s) 12 may send data to, and receive data from, the responsive interface computing device 4. For example, the workstation(s) 12 may transmit data related to tracked operations performed at the physical location 26 to a responsive interface computing device 4.

Although FIG. 1 illustrates three user computing devices 16, 18, 20, the network environment 2 may include any number of user computing devices 16, 18, 20. Similarly, the network environment 2 may include any number of the responsive interface computing device 4, the communication server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the responsive interface computing device 4, the communication server 6, the workstation(s) 12, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet. In some embodiments, the communication network 22 includes multiple communication channels including at least one limited communication channel configured to use with one or more limited communication protocols or schema, such as, for example, SMS communication.

Each of the first user computing device 16, the second user computing device 18, and the Nth user computing device 20 may communicate with the communication server 6 over the communication network 22, such as via a limited communication channel. For example, each of the user computing devices 16, 18, 20 may be operable to transmit and receive data, such as messages, via a limited communinication channel. Each of the user computing devices 16, 18, 20 may be configured to communicate with the communication server 6 via the limited communication channel. The communication server 6 may transmit received data related to interactions via the limited communication channel. For example, a user may operate one of the user computing devices 16, 18, 20 to initiate an SMS text exchange that is directed to an SMS-based interface hosted by the communication server 6. The user may, via an SMS application, perform various operations such as transmitting a message including one or more operation indicators and/or parameters and receive responsive messages. The communication server 6 may capture these interactions as user session data, and transmit the user session data to the responsive interface computing device 4 over the communication network 22. The communication server may allow the user to initiate one or more operations, such as a search operation, via the limited communication channel.

In some embodiments, the responsive interface computing device 4 may execute one or more models, processes, or algorithms, such as a machine learning model, deep learning model, statistical model, etc., to process a received natural language input, perform item searches for one or more sets of inputs, and/or generate a natural language output. the responsive interface computing device 4 may transmit item search results and/or generated combined response messages to the communication server 6 over the communication network 22, and the communication server 6 may generate and transmit a message via the limited communication channel.

In some embodiments, the communication server 6 transmits a message received via the limited communications channel to the responsive interface computing device 4. The message may include at least one operation identifier (e.g., explicit, implied, imputed, etc.) and one or more sets of parameters, the responsive interface computing device 4 parses the message to identify a multi-item search request and two or more sets of search parameters, the responsive interface computing device 4 executes a multi-item search (e.g., individual searches for each identified set of parameters) and generates a combined response including items responsive to each of the sets of parameters. The combined response is provided to the communication server 6 and transmitted via the limited communications channel to the device that generated the original message.

The a responsive interface computing device 4 is further operable to communicate with the database 14 over the communication network 22. For example, the responsive interface computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the responsive interface computing device 4, in some embodiments, the database 14 may be a local storage device, such as a hard drive, a non-volatile memory, or a USB stick. the responsive interface computing device 4 may store interoperation data received from the communication server 6 in the database 14. the responsive interface computing device 4 may also receive from the communication server 6 user session data identifying events associated with prior interactions, and may store the user session data in the database 14.

In some embodiments, the responsive interface computing device 4 generates training data for a plurality of models (e.g., machine learning models, deep learning models, statistical models, algorithms, etc.) based on the received input messages and corresponding generated output responses. the responsive interface computing device 4 and/or one or more of the processing devices 10 may train one or more models based on corresponding training data. the responsive interface computing device 4 may store the models in a database, such as in the database 14 (e.g., a cloud storage database).

The models, when executed by the responsive interface computing device 4, allow the responsive interface computing device 4 to identify multi-item search requests and corresponding parameters sets, execute individual searches for each parameter set in the multi-item search request, and generate a combined response incorporating portions of the search results for each of the parameter sets in the multi-item search request. For example, the responsive interface computing device 4 may obtain one or more models from the database 14. the responsive interface computing device 4 may then receive, in real-time from the communication server 6, a message received via the limited communication channel. In response to receiving the message, the responsive interface computing device 4 may execute one or more first models to parse the received message to identify at least one operation request and one or more sets of parameters. After identifying a multi-item search request and two or more sets of parameters, the responsive interface computing device 4 may execute one or more second models to perform item searching for each of the sets of parameters, the responsive interface computing device 4 may further execute the one or more first models and/or execute one or more third models to generate a combined response incorporating portions of each of the search results for each of the sets of parameters.

In some embodiments, the responsive interface computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units.

Figure 2:
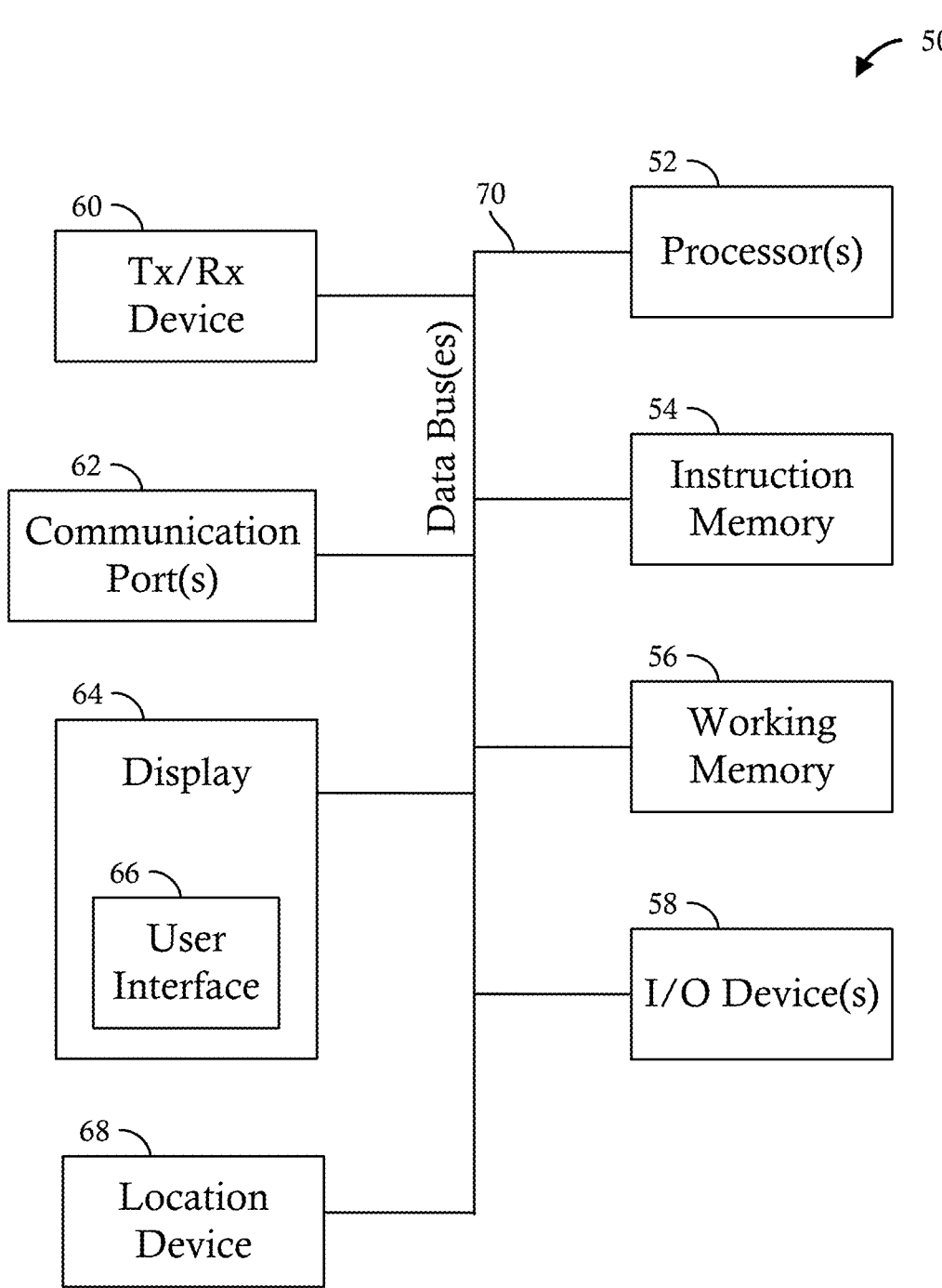
FIG. 2 illustrates a computer system configured to implement one or more processes, in accordance with some embodiments.

FIG. 2 illustrates a block diagram of a computing device 50, in accordance with some embodiments. In some embodiments, each of the responsive interface computing device 4, the communication server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure.

The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interoperation applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for limited-channel multi-item search, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interoperation with limited communication applications. For example, the user interface 66 may be a user interface for an application of a limited communication channel, such as SMS messaging, that allows a user to generate and receive messages via the limited communication channel. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to the location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
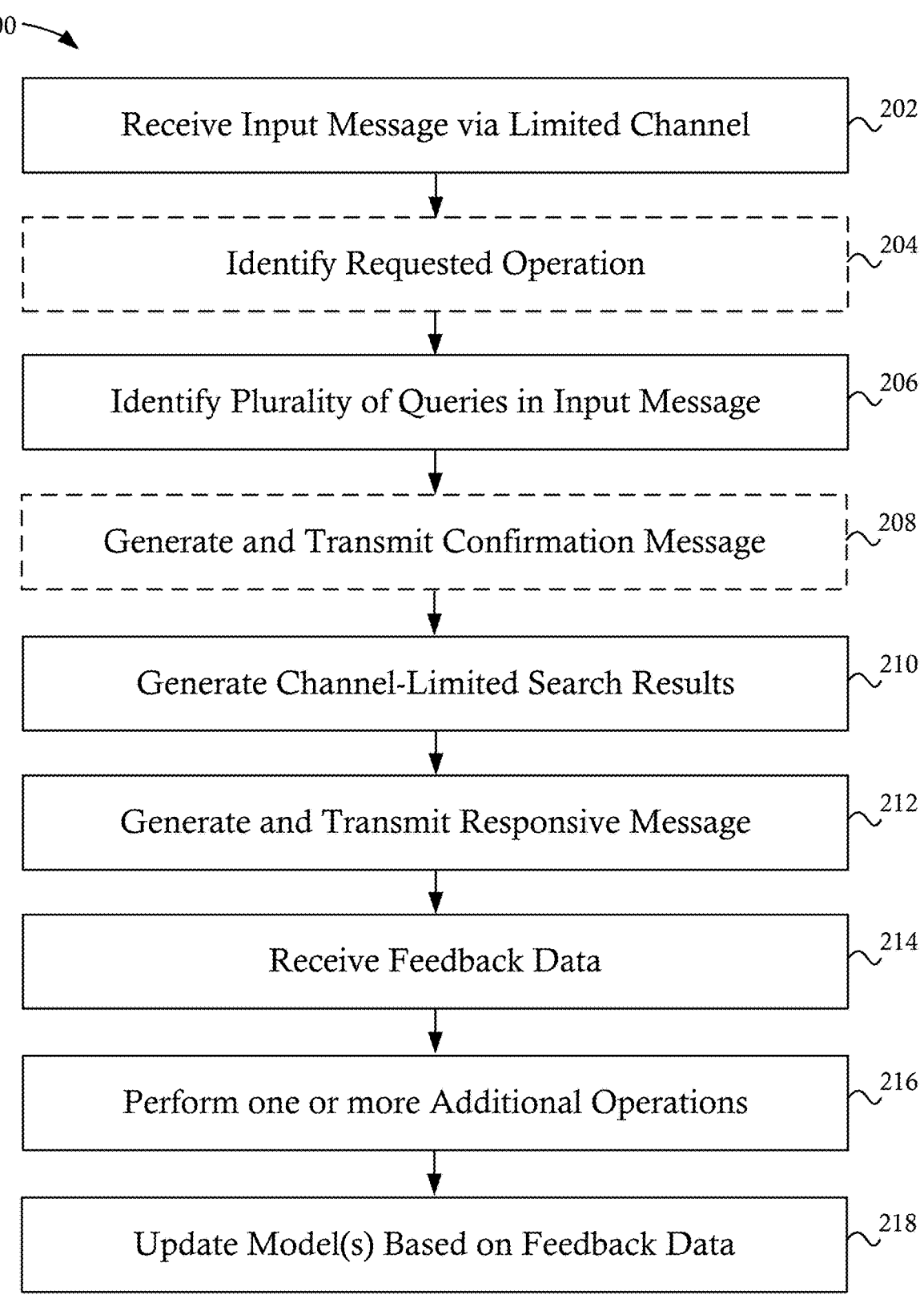
FIG. 3 is a flowchart illustrating a limited-channel communication method, in accordance with some embodiments.
Figure 4:
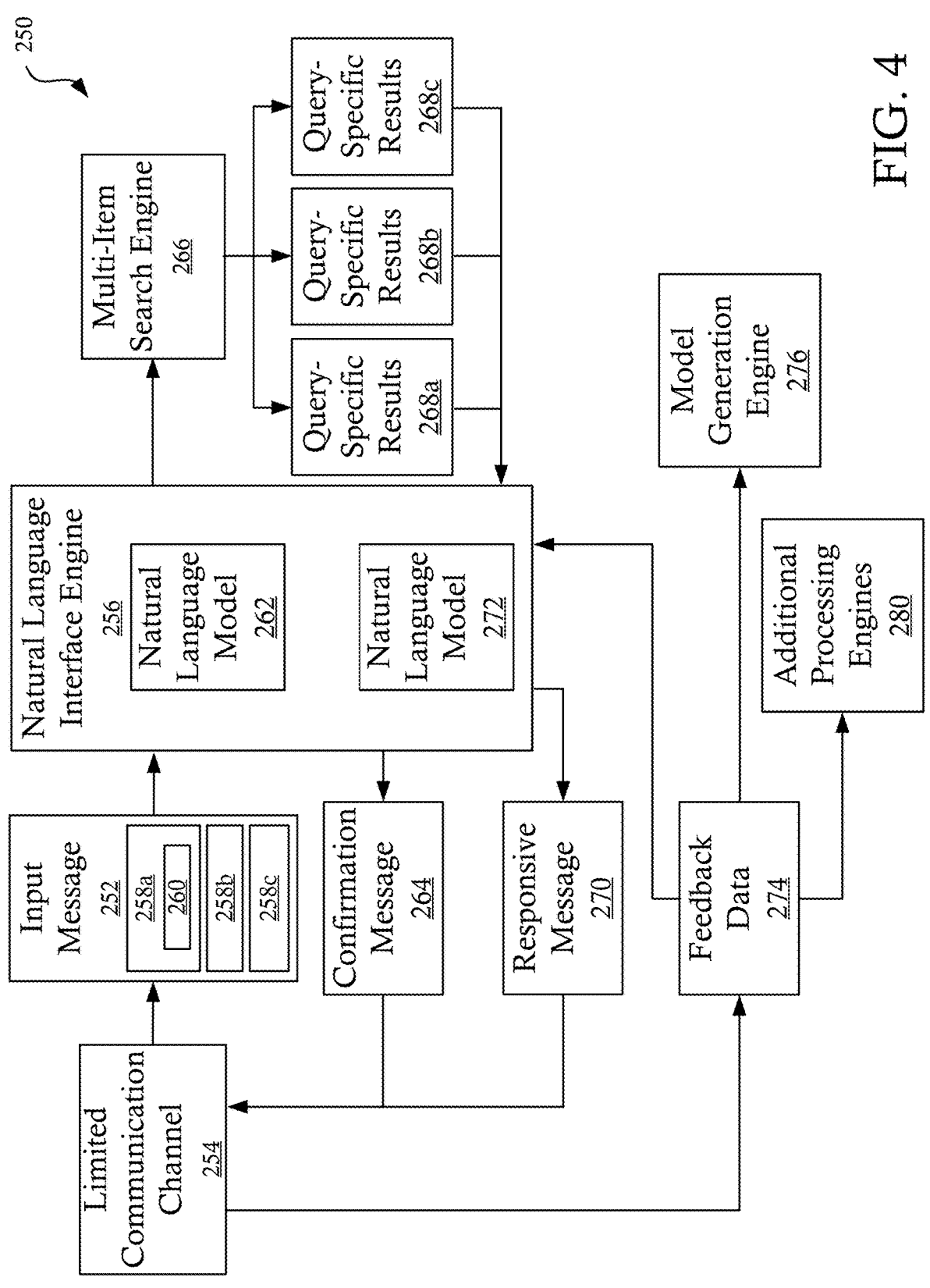
FIG. 4 is a process flow illustrating various steps of the limited-channel communication method of FIG. 3, in accordance with some embodiments.

FIG. 3 is a flowchart illustrating a limited-channel communication method 200, in accordance with some embodiments. FIG. 4 is a process flow 250 illustrating various steps of the limited-channel communication method 200, in accordance with some embodiments. At step 202, an input message 252 is received via a limited communications channel 254. The input message 252 may include one or more queries 258. The limited communications channel 254 may include any suitable channel for transmitting and/or receiving a limited format message. For example, in some embodiments, the limited communications channel 254 includes a channel configured to utilize one or more limited character formats such as an SMS communications channel configured for transmission of SMS messages. SMS protocols include a limited character count, such as, for example, 140 8-bit characters, 160 8-bit characters, 70 16-bit characters, etc. As used herein, the term "character" may refer to an alphanumeric character and/or may refer to non-alphanumeric characters such as Unicode characters (e.g., symbols, emojis, etc.) that may be identified by a predetermined number of bits (e.g., 8-bits, 16-bits, etc.) and that may be rendered (e.g., displayed) and/or processed by an application, module, engine, etc. configured to communicate via the limited communications channel.

In some embodiments, the limited communications channel 254 includes a channel configured to utilize a limited data format capable of transmitting, rendering, and/or processing messages including non-character data, such as Multimedia Messaging Service (MMS), Rich Communications Service (RCS), iMessage, encrypted messaging services, etc. The limited communications channel 254 may interface with a communication application configured to render and/or display messages, including non-character messages, on a user computing device 16, 18, 20. Although limited data formats may include non-character data, it will be appreciated that a limited format message and/or the limited communications channel 254 provide one or more restrictions or constraints for content and/or message format for communications over the limited communications channel 254.

In some embodiments, a communication application may be configured to modify non-conforming messages to conform to one or more communication protocols utilized by the limited communications channel 254. For example, a communications application may be configured to split messages exceeding a character or data limit into two or more messages that conform to the limited communications channel protocol, concatenate multiple individual messages received via the limited communication channel 254 to generate a non-conforming message, wrap and/or repackage a non-conforming message in a protocol suitable for use with the limited communications channel 254, etc.

In some embodiments, an input message 252 includes an SMS message generated by a user computing device 16, 18, 20 via a communication application configured to generate, transmit, and/or receive SMS messages. An SMS message may be transmitted via a cellular communication network using an SMS messaging protocol. The SMS message may be received by a frontend communication system, such as the communication server 6, configured to receive an SMS message via the limited communications channel 254. The communications server 6 may be configured to perform additional processing in response to the SMS message, such as, for example, repackaging the SMS message for transmission over the communications network 22, forwarding the SMS message to additional systems or processes, etc. Although embodiments are discussed herein including SMS messages, it will be appreciated that the disclosed systems and methods may be applied to any suitable limited messaging protocol, such as, for example, MMS, RCS, iMessage, encrypted messaging services, etc.

In some embodiments, an input message 252 may be received, re-transmitted, reformatted, and/or otherwise processed by one or more intervening systems or networks. For example, transmission of an SMS input message 252 may include receipt, processing, forwarding, repackaging, etc. of the input message 252 by one or more cellular network systems configured to receive and route an SMS message from a user computing device 16, 18, 20 to an intended recipient, e.g., the communication server 6, a responsive interface computing device 4, etc.

In some embodiments, the limited communication channel 254 and/or portions of related processing systems such as a natural language interface engine 256 (discussed below) may impose one or more delays resulting in corresponding delays or lag times in communication turns, where a turn consists of transmission of a message and wait time until receipt of a response message. Transmission via the limited communication channel 254 and processing of the input message 252 via a natural language interface engine 256 may impose delays in each turn of 10 seconds, 15 seconds, 20 seconds, 30 second, etc. In some embodiments, delays accrued at each turn may compound over the course of a multiple turn (e.g., multiple message) communication via the limited communication channel 254, making such communications impractical and/or inconvenient via the limited communication channel 254. For example, systems that provide only individual item searching may incur a turn delay for each item that is to be searched, causing unacceptable delays when searching for multiple items. As discussed herein, the disclosed systems and methods, such as the limited-channel communication method 200, address these limitations by generating a multi-item search response based on a single received input message 252.

At optional step 204, a requested operation may be identified in response to the input message 252. For example, an input message 252 may include a string, text, phrase, etc. representative of or related to a requested operation, such as a multi-item search operation, that may be performed by a responsive interface computing device 4. In various embodiments, a responsive interface computing device 4 may be configured to implement one or more of a single item search, a multi-item search, an add-to-cart process, a purchase process, a delivery information process, a help process, etc. The input message 252 may include an express and/or an implied operation identification.

An express operation identification may include a term or phrase corresponding to an operation performable by the responsive interface computing device 4, such as "search," "add-to-cart," etc. As one non-limiting example, an input message 252 including an express operation identification may include "search milk, bread, eggs," where "search" is an express operation identification for a multi-item search related to the included queries, e.g., "milk," "bread," and "eggs." An express identifier can include a synonym or other related term mapped to operations performable by the responsive interface computing device 4, such as "find" or "look-up" for performing a search operation.

In some embodiments, an implied operation identifier may include a word, term, phrase, character, etc. that does not directly relate to an operation performable by the responsive interface computing device 4 but that is understood to request or be related to an operation. As one non-limiting example, an input message 252 including an implied operation identifier may include the string "I need milk, bread, and eggs," where "I need" implies an intent to search for and purchase the listed items, requiring execution of a search operation as an initial step.

In some embodiments, an implied operation identifier may be determined based on one or more states of a system, such as the responsive interface computing device 4, and/or one or more states of an interoperation between a user computing device 16, 18, 20 and the responsive interface computing device 4. For example, a responsive interface computing device 4 may be configured to perform two or more operations, such as a search operation and an add-to-cart operation. An input message 252 that includes a set of queries 258 without an operation identifier may imply a search request, e.g., imply execution of a search operation. Similarly, an input message 252 received subsequent to one or more other messages may inherit an intent or operation from a previously provided message, for example, a second input message including the string "also cereal" received after a first input message including the string "milk, bread, and eggs" may inherit a search operation that was identified for the first input message.

In some embodiments, the responsive interface computing device 4 executes a default operation when receiving an input message 252. For example, a responsive interface computing device 4 may be configured to execute a search operation (e.g., a multi-item search operation) in response to any input message 252 received. Additional operations may be performed by providing separate and/or alternative inputs to the responsive interface computing device 4, for example, via the limited communications channel 254 and/or via additional communications channels. It will be appreciated that any suitable rules may be applied to identify one or more express, implied, inherit, and/or default operations for execution in response to an input message 252.

In some embodiments, when a search operation (e.g., a multi-item search operation) is identified at step 204, the limited-channel communication method 200 proceeds to step 206. Alternatively, when an operation other than a search operation is identified (e.g., an add-to-cart operation), the limited-channel communication method 200 may execute additional and/or alternative steps and/or processes (not shown) to execute the requested operation. In some embodiments, step 204 is omitted and the limited-channel communication method 200 proceeds from step 202 directly to step 206.

At step 206, one or more queries 258*a*-258*c* (collectively "queries 258") are identified in (e.g., parsed from) the input message 252. In some embodiments, a natural language interface engine 256 is configured to identify the queries 258 in the input message 252. The natural language interface engine 256 may be configured to implement (e.g., execute) one or more natural language models 262 to identify the queries 258. As discussed in greater detail below, a natural language model 262 may be configured to output each of the queries 258 for use in additional processes. The natural language interface engine 256 may include any suitable engines, modules, models, modules, etc. configured to facilitate natural language interactions between a user device and the responsive interface computing device 4. In some embodiments, the natural language interface engine 256 includes a chatbot engine.

In some embodiments, each of the queries 258 includes one or more features modifying the query. For example, each of the queries 258 may include a phrase, string, character, etc. corresponding to a base item or item type within a corresponding network catalog, such as an e-commerce catalog. As one non-limiting example, an input message 252 may specify "bread, milk, eggs," with each of "bread," "milk," and "eggs" being a query 258 for an item in a corresponding e-commerce catalog. Although specific embodiments are discussed herein, it will be appreciated that any suitable queries 258 may be provided corresponding to items in any suitable network catalog.

In some embodiments, the natural language model 262 may be configured to identify each of the queries 258 based on an embedding comparison. An embedding may include a vector representation or projection of a word, phrase, character, etc. into a vector space. In some embodiments, the natural language model 262 is configured to identify semantic elements within the input message 252, generate embeddings for each semantic element, and identify queries 258 based on a comparison of each semantic element to known queries, query vector spaces, etc. In some embodiments, a natural language model 262 may be configured to identify separation characters used to separate queries in an input message 252. Separation characters may include, but are not limited to: "empty" characters such as spaces, tabs, returns, line breaks, etc.; punctuation characters such as commas, semi-colons, bullets, asterisk, etc., separation words (e.g., "and"), etc.

In some embodiments, the input message 252 includes at least one feature string 260 associated with a corresponding one of the queries 258. A feature string 260 may include a character, phrase, term, etc. that modifies a corresponding one of the queries 258 and/or provides additional context for the corresponding one of the queries 258. For example, in an e-commerce environment, a feature string 260 may include, but is not limited to, a brand, flavor, size, color, quantity, ingredient, etc. that limits or otherwise narrows the requested results of a search for the corresponding one of the queries 258. As one non-limiting example, an input message 252 may specific "whole wheat bread, 2% milk, eggs" where "whole wheat" is a feature string associated with the query "bread" and "2%" is a feature string associated with the query "milk." Although specific embodiments are discussed herein, it will be appreciated that any suitable feature strings may be provided corresponding to features of items in any suitable network catalog.

In some embodiments, the natural language model 262 is configured to identify domain-specific queries 258 and/or feature strings 260. For example, in the context of an e-commerce environment, a natural language model 262 may be configured to differentiate between use of a brand name as a feature string (e.g., BrandX ItemY) and use of a brand name as a query. As one non-limiting example, an input message 252 may utilize the brand name "Doritos" to identify a specific brand of product, e.g., Doritos Chips, or may use "Doritos" to identify a feature such as a flavor of a different product, e.g., Doritos-Flavored Popcorn. The natural language model 262 may be configured, for example via a labeled dataset applied during an iterative training process, to differentiate between use of a brand name as a feature string and use of a brand name as a query.

In some embodiments, the natural language model 262 is generated via a training process configured to revise (e.g., retrain or update) the natural language model 262 based on received feedback to incorporate and/or track language usage by users within a corresponding domain. For example, a reinforcement learning mechanism, a feedback learning mechanism, a retraining process, etc. may be utilized to update or modify a natural language model 262 based on modified training datasets incorporating feedback data such as generated search results and/or responsive messages and corresponding interoperation data generated in response to the responsive message, as discussed in greater detail below.

In some embodiments, the natural language model 262 is configured to output queries 258 formatted for use by one or more additional processes and/or engines, such as a multi-item search engine 266 as discussed in greater detail below. In some embodiments, each of the queries 258 includes a base string (e.g., a string identifying a target item, item category, etc.) and, optionally, one or more feature strings. The queries 258 may be formatted using any suitable format, such as, for example, a string, an object, a list, a matrix, etc.

In some embodiments, the input message 252 may be normalized prior to and/or in conjunction with processing by the natural language model 262. For example, the natural language model 262 may include a rules-based normalization process configured to remove unnecessary characters, normalize forms of terms and/or characters, and/or otherwise normalize an input prior to natural language processing. As another example, in some embodiments, the natural language model 262 may include one or more hidden layers configured to remove unnecessary characters, normalize strings, and/or otherwise normalize an input prior to natural language processing.

At optional step 208, a confirmation message 264 may be generated in response to receipt of the input message 252 and/or detection of one or more queries 258 in the input message 252. The confirmation message 264 may be generated utilizing a communication protocol of the input message 252, a similar communication protocol, and/or a different communication protocol. For example, when the input message 252 includes an SMS message, the confirmation message 264 may be generated as an SMS message and transmitted via the limited-communication channel. As another example, when the input message 252 includes an SMS message, the confirmation message 264 may be generated in a similar, limited-format message such as an MMS message, an RCS message, an iMessage, an encrypted message, etc. It will be appreciated that any suitable confirmation message 264 may be generated and transmitted in response to the input message 252 and/or detection of one or more queries 258.

In some embodiments, the confirmation message 264 includes a predetermined response. The predetermined response may include an indication that the input message 252 has been received and/or an indication that a requested operation, such as a search operation, is being conducted. For example, in some embodiments, a confirmation message 264 may include the text string "Ok, options for each of those, on the way!" in response to an input message 252 intended to execute a multi-item search. In some embodiments, the confirmation message 264 may be generated by a natural language model, such as the natural language model 262, a response-specific natural language model, etc. It will be appreciated that any suitable confirmation message 264 may be generated and provided to a user device in response to receiving an input message 252. It will further be appreciated that step 208 may be omitted (e.g., no confirmation message 264 is sent) and the responsive message 270 (discussed below) may serve to both deliver results in response to a multi-item search and confirmation that the input message 252 was received.

At step 210, a query-specific search result set 268a-268c (collectively "query-specific search results 268") is generated for each of the queries 258 identified by the natural language model 262. For example, in some embodiments, the input message 252 and/or each of the queries 258 are provided to a multi-item search engine 266 configured to execute a multi-item search process to generate the query-specific search results 268. In some embodiments, the query-specific search results 268 include a limited number of user-specific search results generated for a corresponding one of the queries 258.

In some embodiments, the query-specific search results 268 may be generated by an asynchronous, parallel search process. The asynchronous, parallel search process may include one or more parallel threads (e.g., process flows) configured to generate a query-specific search result set 268a-268c for a corresponding query 258a-258c. The parallel threads may be executed in an asynchronous manner (e.g., at least one thread being executed without waiting for at least one other thread to complete execution). Each of the query-specific search result sets 268a-268c are output as they are generated and/or the query-specific search results 268 may be output as a set once each of the threads has finished executing.

Figure 5:
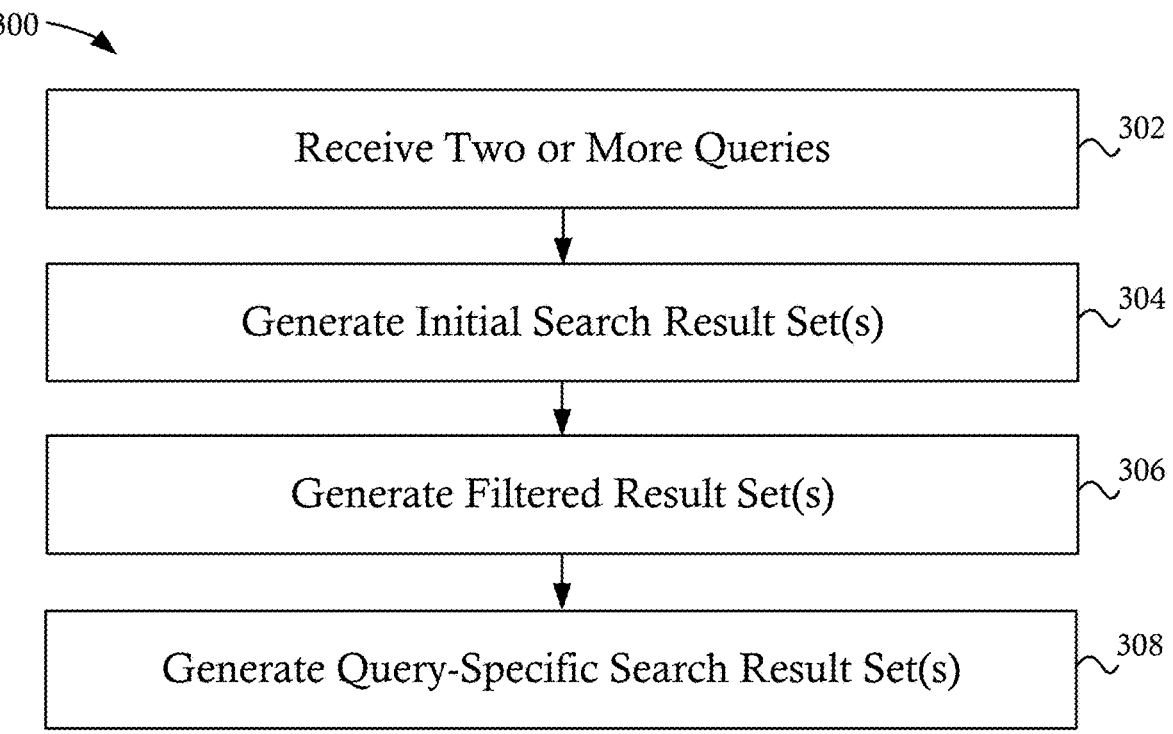
FIG. 5 is a flowchart illustrating a multi-item search method, in accordance with some embodiments.
Figure 6:
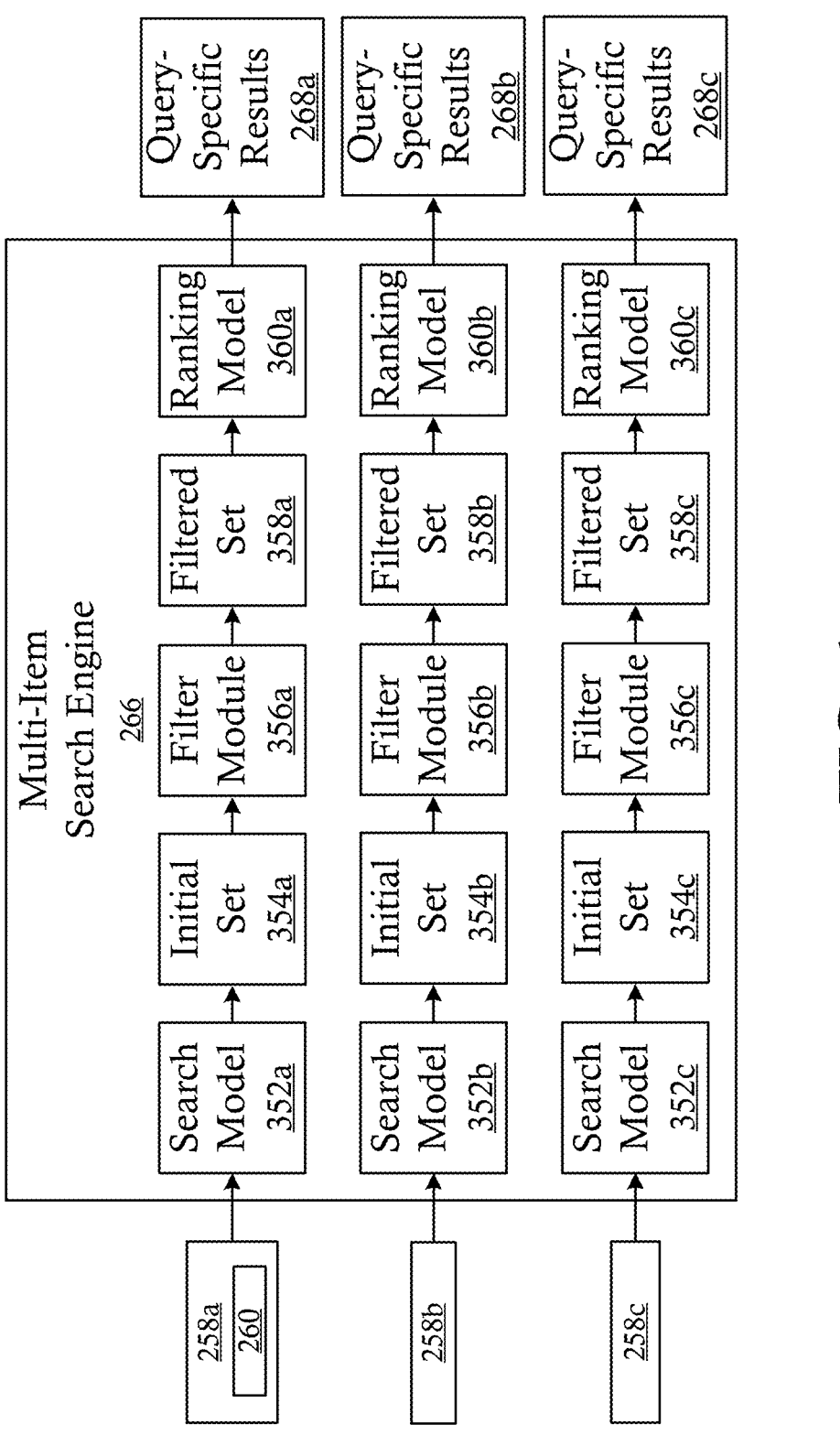
FIG. 6 is a process flow illustrating various steps of the multi-item search method of FIG. 5, in accordance with some embodiments.

FIG. 5 illustrates a multi-item search method 300 configured to generate query-specific search results 268, in accordance with some embodiments. FIG. 6 is a process flow 350 illustrating various steps of the multi-item search method 300, in accordance with some embodiments. The multi-item search method 300 may be implemented by any suitable system, device, engine, module, etc., such as the multi-item search engine 266. At step 302, two or more queries 258 are received. Each of the queries 258 includes a string, phrase, character, etc. representative of an item type, item category, item name, etc. in a corresponding network catalog. In some embodiments, one or more of the queries 258 may additionally include one or more feature strings 260 corresponding to selectable and/or optional features for an item. The queries 258 may be provided in any suitable format, such as an alphanumeric string, Unicode character string, etc.

At step 304, an initial search result set 354a-354c (collectively "initial search results 354") is generated for each of the received queries 258. For example, the multi-item search engine 266 may be configured to implement a plurality of search models 352a-352c (collectively "search models 352"). Each of the search models 352 may be configured to execute a search for a corresponding query 258a-258c. The search models 352 may include any suitable search framework, such as, for example, an XGBoost and/or a LambdaMART framework. The search models 352 may include general search models (e.g., search models used by a network environment for general searching and trained on general datasets) and/or may be limited-channel specific search models (e.g., search models trained on datasets including limited-channel communication datasets).

At step 306, a filtered result set 358a-358c (collectively "filtered sets 358") is generated for a corresponding initial search result set 354a-354c. Filtered sets 358 may be generated by filtering the initial search results 354 according to one or more predetermined criteria. The predetermined criteria may include, but are not limited to, search-specific criteria, user-specific criteria, system-specific criteria, etc. For example, in some embodiments, filtered sets 358 may be generated by identifying a pickup location associated with a user computing device 16, 18, 20 that generated an input message 252 and eliminating items from the initial search results 354 that are not available for pickup and/or purchase at the identified pickup location. Although specific embodiments are discussed herein, it will be appreciated that any suitable filtering criteria may be applied to generate the filtered sets 358. In some embodiments, one or more filtering modules 356a-356c may be configured to apply one or more rules-based filtering criteria to the initial search results 354 to generate corresponding filtered sets 358.

At step 308, a query-specific search result set 268a-268c is generated from each of the filtered sets 358. Query-specific search results 268 may be generated by one or more user-specific ranking models 360a-360c (collectively "user-specific ranking models 360"). The user-specific ranking models 360 may each be configured to receive one of the filtered sets 358 and a user-specific feature set 362 and generate a corresponding query-specific search result set 268a-268c. The user-specific ranking models 360 may be configured to rank items in a filtered search result set 358a-358c based on one or more user-specific features included in the user-specific feature set 362. The one or more user-specific features may be derived from historical user interactions (such as user purchase history, user search history, user preferences, etc.), user defined preferences, etc. In some embodiments, user-specific features include embeddings and/or other representations of historical interactions, user defined preferences, etc.

In some embodiments, the query-specific search results 268 each include a set of the top ranked N items (where N is a natural number) selected from a corresponding filtered result set 358a-358c. For example, in some embodiments, each of the query-specific search results 268 include the three top-ranked results selected from a corresponding filtered result set 358a-358c. Although specific embodiments are discussed herein, it will be appreciated that any suitable number of results may be selected from a corresponding filtered result set 358a-358c.

Although steps 304-308 are illustrated as separate steps performed by separate models and/or modules, e.g., search models 352, filtering modules 356, user-specific ranking models 360, etc., it will be appreciated that two or more of steps 304-310 may be performed by a single trained model for a corresponding query 258a-258c. For example, in some embodiments, each of the search models 352 is configured to receive a query 258a-258c as an input and generate a query-specific search result set 266a-266c as an output. Each of the search models 352 may include integrated layers and/or models configured to perform one or more of steps 304-308, such as, for example, one or more layers defining an initial search model, a filtering process, a user-specific ranking process, and/or a selection process. Additionally and/or alternatively, each of the search models 352 may utilize a model framework that integrates multiple steps into a single step, such as, for example, generating initial search result sets based on a user-specific model framework that generates a set of user-specific initial search results (e.g., effectively combining steps 304 and 308 into a single step). It will be appreciated that any suitable combination of models and/or algorithms configured to implement each of the disclosed steps as any number of discrete and/or combined functions may be utilized to generate the query-specific search results 268 and/or perform any intermediate step of the multi-item search method 300.

In some embodiments, one or more of steps 304-308 may be executed asynchronously and/or in parallel for two or more queries 258. For example, in some embodiments, the multi-item search engine 266 is configured to implement multiple threads or processes in parallel. Each thread includes one of a search model 352a-352c, a filtering module 356a-356c, and/or a ranking model 360a-360c. Each thread is executed in parallel to receive a query 258a-258c and generate a corresponding query-specific search result set 266a-266c. Each of the threads may be executed in parallel (e.g., at the same time) and/or asynchronously (e.g., without waiting for other threads to complete execution). In some embodiments, two or more threads may be partially asynchronously executed.

In some embodiments, one or more of the threads may be provided to one of the processing device(s) 10 for execution, for example, in parallel with other threads provided to other of the processing devices 10. In some embodiments, two or more of the threads may be executed in parallel by two or more cores of a multi-core processor, such as a multi-core processor integrated into the responsive interface computing device 4, a multi-core processor integrated into a processing device 10, and/or any other suitable processor. It will be appreciated that any suitable parallel processing schema may be used to execute the threads. In some embodiments, the multi-item search engine 266 is configured to implement a thread for each of the queries 258 identified in the input message 252 and execute each of the threads asynchronously and in parallel.

With reference again to FIGS. 3-4, at step 212, a responsive message 270 is generated and transmitted via the limited communications channel. The responsive message 270 may include at least a portion of each of the query-specific search result sets 268a-268c. For example, in some embodiments, the responsive message 270 includes each of the query-specific search result sets 268a-268c. As another example, in some embodiments, the responsive message 270 includes a set of M items (where M is a natural number) selected from each of the query-specific search result sets 268a-268c. Although specific embodiments are discussed herein, it will be appreciated that the responsive message 270 can include any portion and/or all of the query-specific search results 268.

In some embodiments, the responsive message 270 includes a format suitable for transmission over the limited communications channel 254. In some embodiments, the responsive message 270 is generated in the same format (e.g. according to the same messaging protocol) as the input message 252. For example, in some embodiments, when the input message 252 includes an SMS message, the responsive message 270 is generated as an SMS message (e.g., in conformance with to the SMS messaging protocol). In some embodiments, the input message 252 is received in a first format and the responsive message 270 is generated in a second format. The first format and the second format are each compatible with transmission over the limited communications channel. For example, in some embodiments, the input message 252 may include an SMS message and the responsive message 270 may include a second messaging protocol, such as an MMS message, an iMessage, an RCS message, etc., suitable for transmission over the same limited communications channel used to deliver the initial input message 252.

In some embodiments, the responsive message 270 is transmitted via a separate communications channel. For example, in some embodiments, the input message 252 may be received via a limited communications channel 254, such as, for example, an SMS communications channel. The responsive message 270 may be transmitted to the user device that generated the input message 252 via a second communications channel. The second communications channel may include a communication channel capable of transmitting additional data and/or content as compared to the first communications channel. For example, in some embodiments, the second communications channel may include a messaging protocol such as iMessage, an encrypted messaging protocol, etc.

In some embodiments, the responsive message 270 is generated by the natural language interface engine 256. For example, in some embodiments the natural language interface engine 256 includes a second natural language model 272. The second natural language model 272 is configured to receive the query-specific search results 268 and the input message 252 as inputs and generate the responsive message 270 as an output. In some embodiments, the second natural language model 272 utilizes a template-based generation process to generate a responsive message 270. For example, in some embodiments, the second natural language model 272 obtains a template related to the messaging protocol selected for the responsive message 270. As discussed above, the messaging protocol may include the same messaging protocol as the input message 252, a different messaging protocol appropriate for delivery via the limited communications channel 254, and/or a different messaging protocol appropriate for delivery via second communications channel. Although embodiments are discussed herein including separate natural language models 262, 272 for processing the input message 252 and generating a responsive message 270, it will be appreciated that a single natural language model may be configured to process the received input message 252 and generate the responsive message 270 in some embodiments.

In some embodiments, the template includes a preformatted response message including one or more insertion points configured to receive insertion of one or more query-specific search results 268. For example, a template may include a prewritten response, a predetermined display image, and/or any other suitable predetermined interface element and one or more slots configured to receive at least a portion of the query-specific search results 268. In some embodiments, the second natural language model 272 may be configured to select one of two or more templates based on one or more parameters, such as the limited-communication channel, the number of individual items searched, user history, etc.

In some embodiments, at step 214, feedback data 274 is received in response to transmission of the responsive message 270. For example, after the responsive message 270 is transmitted, additional inputs may be provided via a user device to perform one or more additional operations, such as selecting one of a plurality of items provided in a set of query-specific search results, adding one or more items to a cart, purchasing one or more items, leaving feedback (e.g., ratings) for one or more items, etc. The feedback data 574 may be provided directly by the user computing device 16, 18, 20 that initially generated the input message 252 and/or may be generated by additional systems or devices interacting with the user computing device 16, 18, 20.

At step 216, one or more additional operations or processes are executed in response to the received feedback data 274. For example, in some embodiments, the feedback data 274 includes a second (or subsequent) message received from the user computing device 16, 18, 20. The second message may be generated in response to the responsive message 270 and/or in response to additional inputs received by the user computing device 16, 18, 20 (as discussed in greater detail below).

As one example, in some embodiments, an additional processing engine 280 may include a processing engine configured to perform an add-to-cart operation that populates and/or updates a user cart with items selected from the query-specific search results 268 included in the responsive message 270. As another example, an additional processing engine 280 may enable a purchase operation that automatically completes a purchase transaction for the items selected from the query-specific search results 268 and provides delivery of those items via a default delivery mechanism. It will be appreciated that any suitable additional operation may be executed by an additional processing engine 280 and/or any other suitable engine in response to the feedback data 274.

In some embodiments, additional operations may be performed by the natural language interface engine 256. For example, in some embodiments, the feedback data 274 includes one or more additional messages received in response to and/or subsequent to the responsive message 270. Additional messages may be provided to the natural language interface engine 256 for parsing, e.g., for identification of an associated action and one or more inputs, such as one or more additional queries. In some embodiments, the natural language interface engine 256 may be configured to generate an output used by one or more additional processes, such as, for example, one or more additional processing engines 280.

At step 218, one or more models may be updated based on the feedback data 274. For example, where the feedback data 274 is related to identification of queries and/or features in the input message 252, the feedback data 274 may be used to update or refine one or more natural language models 262, 272. As another example, where the feedback data 274 is related to the items provided in response to the individual search executed for identified queries 258, the feedback data 274 may be used to update or refine one or more search models 352. It will be appreciated that any suitable feedback data 274 may be received and utilized to refine any of the trained models discussed herein.

In some embodiments, an updated and/or modified training dataset may be generated. The modified training dataset may include at least a portion of the feedback data 274 and/or initial training data modified (e.g., re-labeled) based on the feedback data 274. An updated model, such as an updated natural language model or an updated search model, may be generated and deployed in response to the feedback data 274 (e.g., based on the modified training dataset). In some embodiments, a model generation engine 276 may be configured to generate the modified training datasets and/or implement an iterative training process to generate and/or refine one or more models.

Figure 7A:
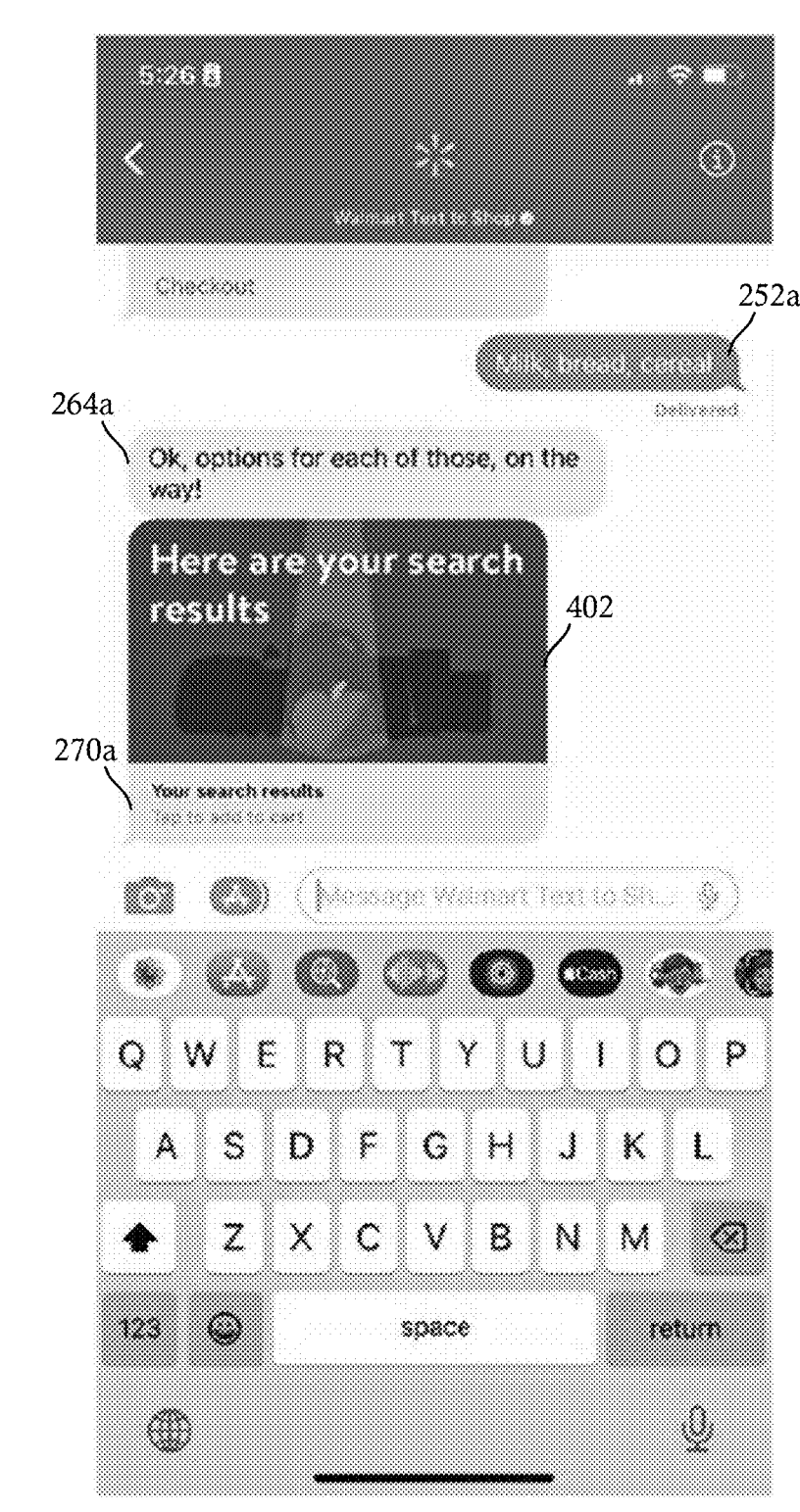
FIGS. 7A-7C illustrate various interfaces generated during execution of a limited-channel communication method, in accordance with some embodiments.
Figure 7B:
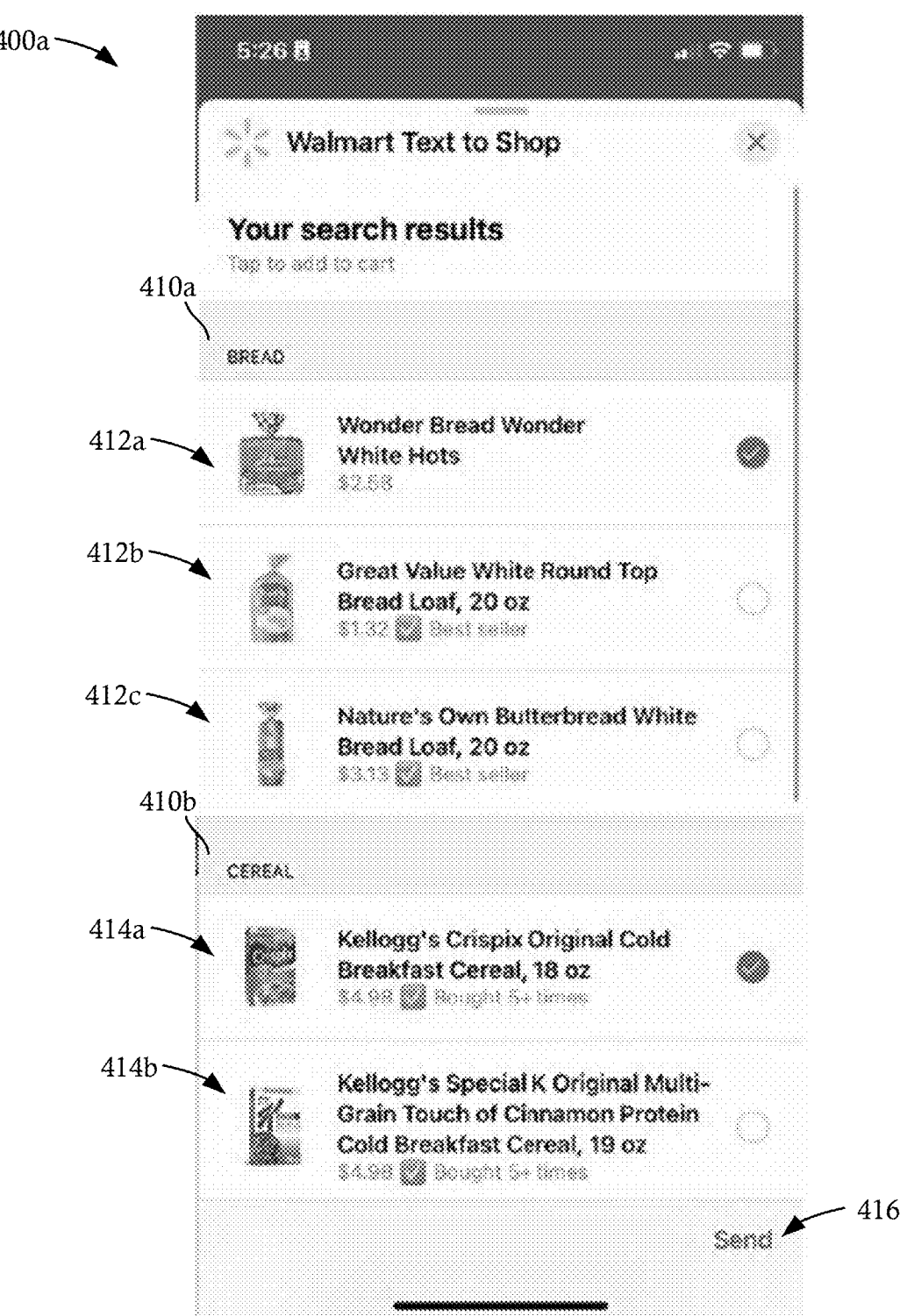
Figure 7C:
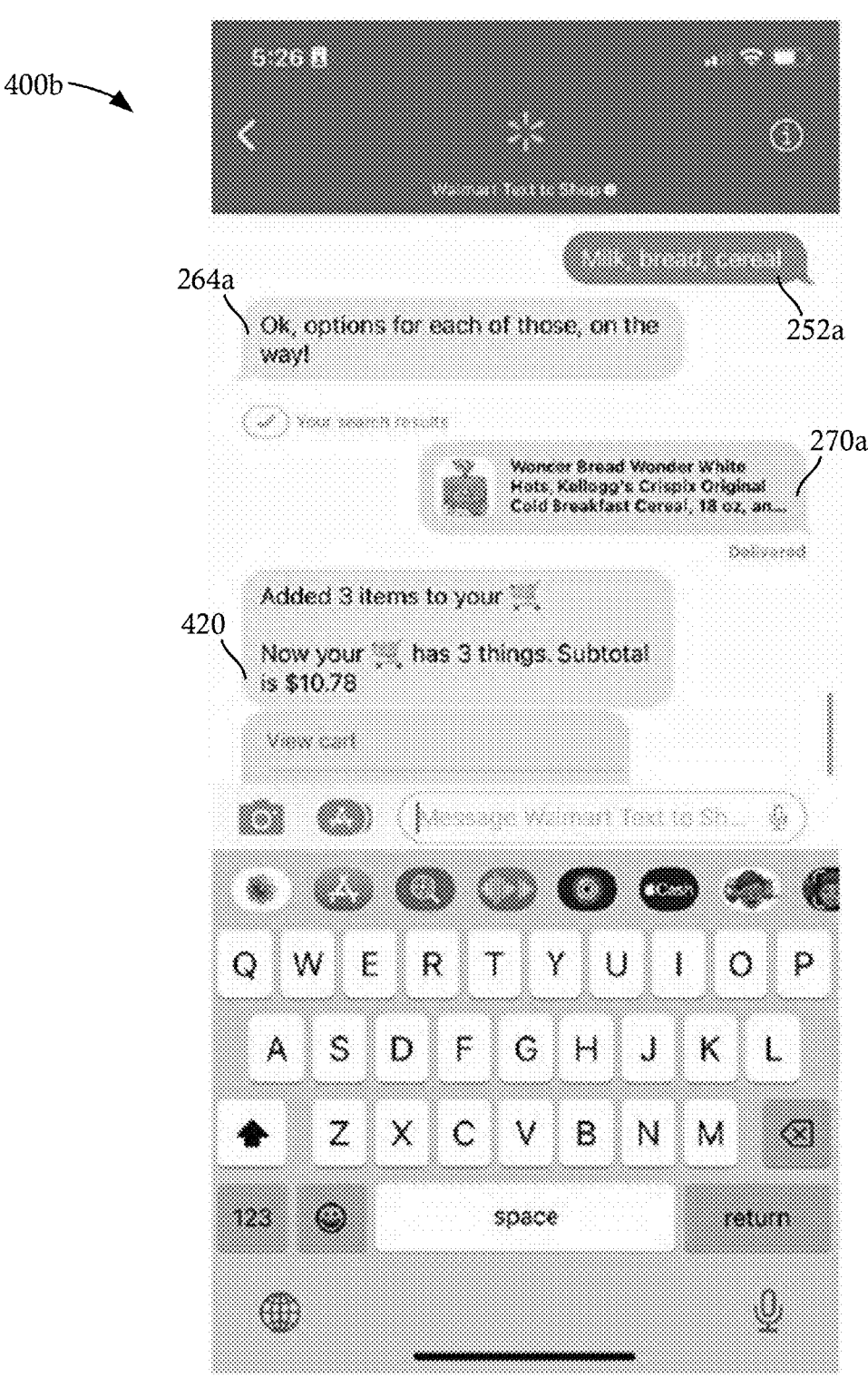

FIGS. 7A-7C illustrate example interfaces 400a-400c that may be generated by a user computing device 16, 18, 20 during execution of a limited-channel communication method 200. FIG. 7A illustrates a limited-channel communication application interface 400 including a user-device generated input message 252a. The user-device generated input message 252a includes a limited-channel message generated by a user device, for example, in response to user input via one or more user input elements (such as the illustrated touch-screen keyboard interface 406). The user-device generated input message 252a is transmitted by the user-device via a limited communications channel, such as, for example, an SMS channel, an iMessage channel, etc.

The user-device generated input message 252a includes three queries separated by commas, e.g., "Milk," "bread," and "cereal." In response to receiving the user-device generated input message 252a, a responsive interface computing device 4 executes a limited-channel communication method 200. As discussed above, the user-device generated input message 252a is received and each of the queries are parsed (e.g., identified) by a natural language model 262. In response to the input message 252a and/or identification of the queries, a confirmation message 264a is generated and transmitted to the user computing device. As shown in FIG. 7A, receipt of the confirmation message 264a causes the user computing device to generate an interface element displaying the received confirmation message 264a. In the illustrated embodiment, the confirmation message 264a includes a text string indicating "Ok, options for each of those, on the way!," confirming receipt of the user-device generated input message 252a and confirming that a multi-item search will be conducted responsive to the input message 252a.

As discussed above, a multi-item search method 300 is executed to perform a multi-item search for each of the queries included in the input message 252a. Asynchronous, parallel search processes are executed for each query, e.g., each of "Milk," "bread," and "cereal," and a set of query-specific search results 268 is obtained for each query. After receiving each of the query-specific search results 268, the responsive interface computing device 4 generates a responsive message 270a.

In the illustrated embodiment, the responsive message 270a is rendered as an enhanced interface element 402. The enhanced interface element 402 enables one or more additional functions other than generation and transmission of a message via the limited communication channel 254. In the illustrated embodiment, the enhanced interface element 402 includes a list sticker interface element configured to enable additional operations on a corresponding user computing device. For example, a user computing device may allow interoperation with the enhanced interface element to cause an additional interface and/or interface elements to be generated, such as the selection list interface 400b illustrated in FIG. 7B.

FIG. 7B illustrates a selection list interface 400b generated in response to interoperation with the responsive message 270a illustrated in FIG. 7A. As shown in FIG. 7B, the selection list interface 400b includes selection portions 410a, 410b each including selectable interface elements 412a-412c, 414a-414b configured to enable additional operations, such as an add-to-cart operation, via the responsive interface computing device 4. Each of the selection portions 410a, 410b correspond to a query identified in (e.g., parsed from) the received input message 252a and the selectable interface elements 412a-412c, 414a-414b in each of the selection portions 410a, 410b correspond to items included in the query-specific search results 268 for the corresponding query. For example, in the illustrated embodiment, the first portion 410a corresponds to a query for "bread" and the second portion 410b corresponds to a query for "cereal." It will be appreciated that additional selection portions and/or additional selectable interface elements may be displayed and/or displayable by the user computing device, for example, in response to scrolling or movement of a user interface.

In some embodiments, the user computing device is configured to receive one or more inputs indicating a selection of one of the selectable interface elements 412a-412c, 414a-414b for each query. The user computing device may subsequently receive an input indicating that a selection has been made for each of the selection portions 410a, 410b. For example, in the illustrated embodiment, an input selecting the "Send" interface element 416 may be received indicating that a selection has been made for each of the selection portions 410a, 410b. In some embodiments, the user computing device generates and transmits a second message, for example, a second message via the limited communication channel 254. The second message may include a second operation intent, such as an add-to-cart operation intent, automatically assigned in response to the input selecting the "Send" interface and/or receipt of a second message (as discussed above).

FIG. 7C illustrates a subsequent interface 400c generated in response to interactions with the selection list interface 400b. The subsequent interface 400c includes the messaging interface illustrated in FIG. 7A with additional messages received. For example, as shown in FIG. 7C, a response message 420 was generated and transmitted in response to the second message generated by the user computing device. The response message 420 indicates that a requested operation, in this instance an add-to-cart operation, has completed successfully. The response message 420 (e.g., a second portion of the response message 420) includes additional interface elements that execute additional operations on the user computing device, such as, for example, a view cart interface element. It will be appreciated that any suitable additional interface elements may be provided in a responsive message 420.

Selection of interface elements associated with limited-channel communications can be burdensome and time consuming for users, especially if each query must be provided in an individual message via the limited-channel communication protocol. Typically, in a limited-channel communication schema, a user may locate information regarding items of interest by providing individual query messages, receiving individual response messages, and performing subsequent operations in response to the individual response messages, referred to as a communication turn. Such communication turns introduce communication delays that compound as the number of items to be searched and/or the number of operations to be performed increases. Thus, the user frequently has to perform numerous communication turns to perform multiple item searches.

Limited-channel communication methods, as disclosed herein, significantly reduce this problem, allowing users to perform multi-item searches with fewer, e.g., in some cases a single, message. For example, in some embodiments described herein, when a user is presented with a responsive message, the responsive message includes, or is configured to generate, a link to an interface page for selecting items from search results for additional operations. Each responsive message thus serves as a programmatically selected navigational shortcut to an interface page, allowing a user to bypass the communication turn structure of traditional text-based, limited-channel interfaces. Beneficially, programmatically identifying multiple queries in a single provided message and presenting a user with navigations shortcuts to perform tasks related to each of the searches may improve the speed of the user's navigation via the limited-communication channel, rather than requiring the user to perform multiple communication turns resulting in long delays and inadequate response times. This may be particularly beneficial for computing devices with small screens, where fewer interface elements are displayed to a user at a time and thus navigation of larger volumes of data is more difficult.

It will be appreciated that generation of communications, such as responsive textual communications in a limited communications channel, as disclosed herein, particularly for searching large catalogs of items, is only possible with the aid of computer-assisted machine-learning algorithms and techniques, such as trained natural language models and/or trained search models. In some embodiments, machine learning processes including natural language processing and/or search models are used to perform operations that cannot practically be performed by a human, either mentally or with assistance, such as parsing of digital messages to identify queries, automatic execution of multiple asynchronous, parallel search operations for each identified query, and generation of a responsive message incorporating interface elements representative of query-specific search results responsive to each identified query. It will be appreciated that a variety of machine learning techniques can be used alone or in combination to parse received input messages, perform asynchronous, parallel searches, and/or generate responsive messages, as discussed herein.

Figure 8:
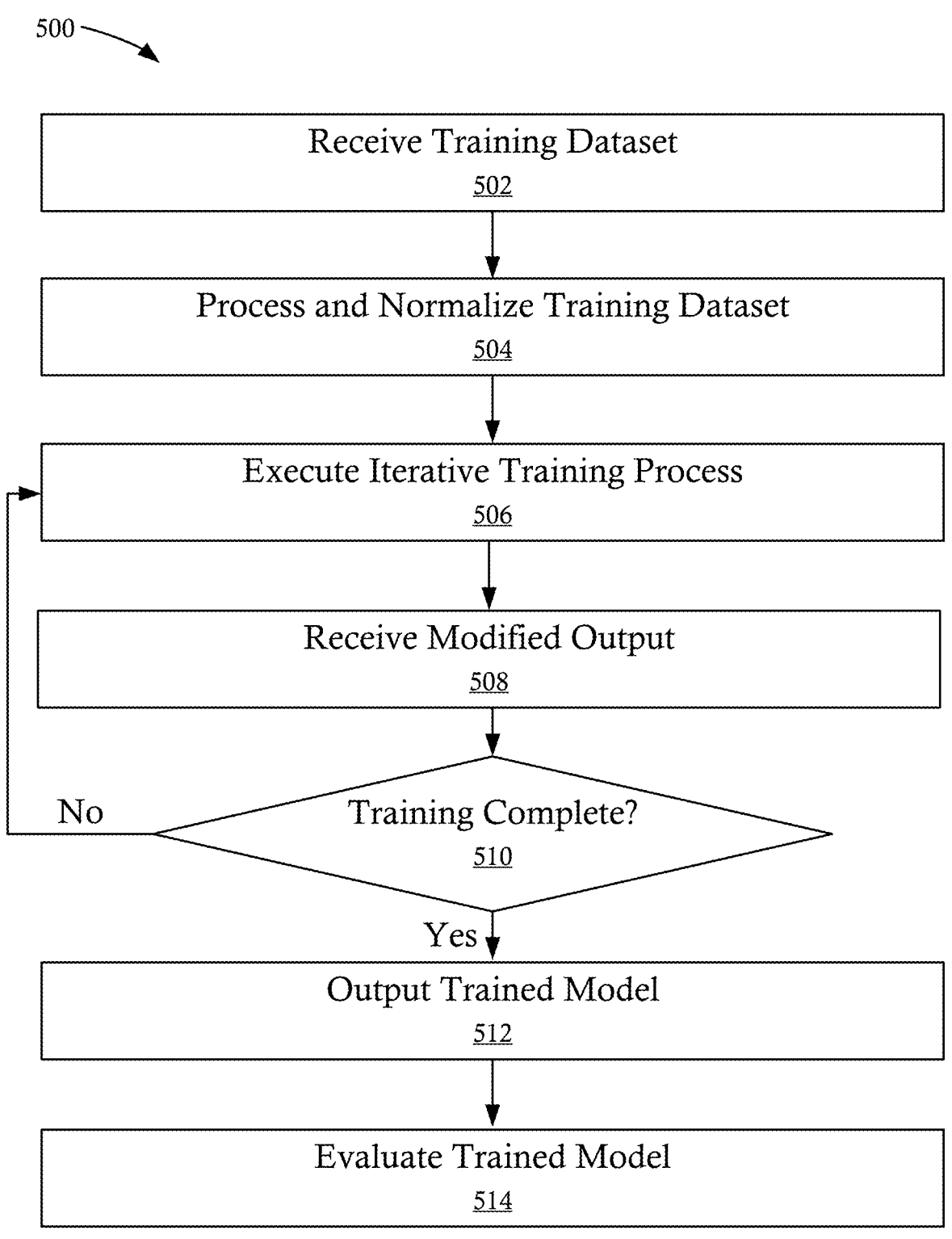
FIG. 8 is a flowchart illustrating a method for generating a trained model, in accordance with some embodiments.
Figure 9:
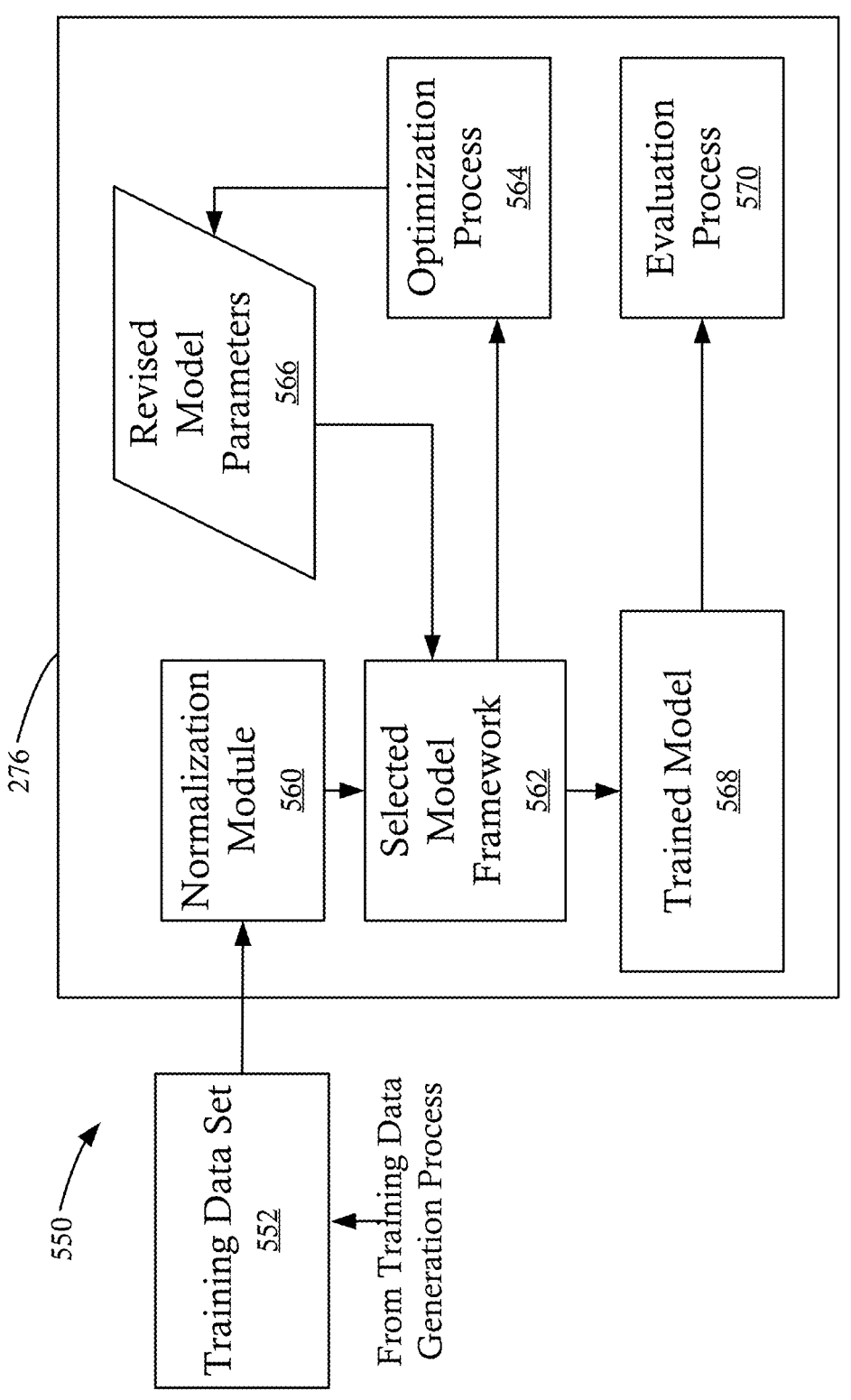
FIG. 9 is a process flow illustrating various steps of the method of generating a trained model, in accordance with some embodiments.

In some embodiments, a natural language interface engine 256 can include and/or implement one or more trained models, such as a natural language models and/or search models. In some embodiments, one or more trained models can be generated using an iterative training process based on a training dataset. FIG. 8 illustrates a method 500 for generating a trained model, such as a trained natural language model and/or a trained search model, in accordance with some embodiments. FIG. 9 is a process flow 550 illustrating various steps of the method 500 of generating a trained model, in accordance with some embodiments. At step 502, a training dataset 552 is received by a system, such as a processing device 10. The training dataset 552 can include labeled and/or unlabeled data. For example, in some embodiments, sets of labeled data including input messages, search result sets, responsive messages, and/or interoperation data may be provided for use in training a model.

At optional step 504, the received training dataset 552 is processed and/or normalized by a normalization module 560. For example, in some embodiments, the training dataset 552 can be augmented by imputing or estimating missing values of one or more features associated with natural language inputs and/or search model inputs. In some embodiments, processing of the received training dataset 552 includes outlier detection configured to remove data likely to skew training of a corresponding natural language model and/or search model. In some embodiments, processing of the received training dataset 552 includes removing features that have limited value with respect to training of the corresponding natural language model and/or search model.

At step 506, an iterative training process is executed to train a selected model framework 562. The selected model framework 562 can include an untrained (e.g., base) machine learning model, such as a bidirectional encoder representations from transformers (BERT) framework, a Robustly Optimized BERT Pretraining Approach (RO-BERTa) framework, a large language framework (e.g., GPT), an XGBoost framework, a LamdaMART framework, etc. and/or a partially or previously trained model (e.g., a prior version of a trained model). The training process is configured to iteratively adjust parameters (e.g., hyperparameters) of the selected model framework 562 to minimize a cost value (e.g., an output of a cost function) for the selected model framework 562.

The training process is an iterative process that generates set of revised model parameters 566 during each iteration. The set of revised model parameters 566 can be generated by applying an optimization process 564 to the cost function of the selected model framework 562. The optimization process 564 can be configured to reduce the cost value (e.g., reduce the output of the cost function) at each step by adjusting one or more parameters during each iteration of the training process.

After each iteration of the training process, at step 508, a determination is made whether the training process is complete. The determination at step 508 can be based on any suitable parameters. For example, in some embodiments, a training process can complete after a predetermined number of iterations. As another example, in some embodiments, a training process can complete when it is determined that the cost function of the selected model framework 562 has reached a minimum, such as a local minimum and/or a global minimum.

At step 510, a trained model 568, such as a trained natural language model and/or search model, is output and provided for use in a limited-channel communication method, such as the limited-channel communication method 200 discussed above with respect to FIGS. 3-4. At optional step 512, a trained model 568 can be evaluated by an evaluation process 570. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of example embodiments, it is not limited thereto. Rather, the appended claims should be construed broadly, to include other variants and embodiments, which may be made by those skilled in the art.

What is claimed is:
1. A system, comprising:
a processor; and
a non-transitory memory storing instructions, that when executed, cause the processor to:
    receive, from a database, training data comprising a plurality of input messages and corresponding search results;

iteratively train a natural language model based on the training data to iteratively adjust parameters and generate a first trained natural language model;

receive an input message from a requesting device via a limited-communication channel;

identify, via the first trained natural language model, a plurality of queries in the input message;

implement a plurality of search threads, wherein each of the plurality of search threads is configured to generate search results for a corresponding one of the plurality of queries;

input each of the plurality of queries into a corresponding one of the plurality of search threads and generate the corresponding search results;

generate a responsive message comprising at least a portion of the search results for each of the corresponding one of the plurality of queries; and transmit the responsive message to the requesting device.

2. The system of claim 1, wherein:

the input message comprises the plurality of queries and an operation identification; and the operation identification includes at least one of:

an express operation identification expressly indicating a multi-item search operation, or an implied operation identification implying a multi-item search operation based on interoperations between the system and the requesting device.

3. The system of claim 1, wherein:

each of the plurality of queries includes a query string representing at least one of: a respective item type, a respective item category, or a respective item name;

the input message includes a feature string for at least one of the plurality of queries; and the feature string modifies the at least one of the plurality of queries based on: brand, flavor, size, color, quantity, and/or ingredient.

4. The system of claim 1, wherein the plurality of queries are identified based on:

identifying semantic elements within the input message;

generating embeddings for each of the semantic elements, wherein each of the embeddings includes a respective vector representation in a same vector space;

identifying the plurality of queries based on an embedding comparison between each semantic element and known queries in the same vector space; and identifying separation characters separating the plurality of queries in the input message.

5. The system of claim 1, wherein the processor is configured to:

generate a confirmation message in response to an identification of the plurality of queries, wherein the confirmation message includes an indication that the input message has been received and a multi-item search operation is being conducted; and transmit the confirmation message to the requesting device before implementing the plurality of search threads.

6. The system of claim 5, wherein:

the input message is received via a first protocol associated with one of: a short message/messaging service (SMS), a multimedia messaging service (MMS), a rich communications service (RCS), or an encrypted messaging service; and the confirmation message is transmitted via a second protocol different from the first protocol.

7. The system of claim 1, wherein:

the plurality of search threads are implemented using a trained search model;

the trained search model includes at least one of: a regression model, an Extreme Gradient Boosting (XG-Boost) model, or a lambdaRank and Multiple Additive Regression Trees (lambdaRankMART) model; and the first trained natural language model includes at least one of: a bidirectional encoder representations from transformers (BERT) model, a Robustly Optimized BERT Pretraining Approach (ROBERTa) model, or a large language model.

8. The system of claim 1, wherein:

each of the plurality of search threads is executed in parallel; and the plurality of search threads are executed in an asynchronous manner.

9. The system of claim 1, wherein the responsive message is generated based on:

filtering the search results for all of the plurality of queries to generate a filtered search result set for each query, according to at least one of: a search-specific criteria, a user-specific criteria, or a system-specific criteria;

ranking items in each filtered search result set to generate a corresponding ranked search result set for each query, based on historical user interactions and/or user defined preferences; and generating the responsive message based on a predetermined number of top-ranked items selected from each ranked search result set.

10. The system of claim 1, wherein the first trained natural language model is trained based on:

normalizing a training dataset;

executing an iterative training process to generate the first trained natural language model based on the normalized training dataset, by iteratively adjusting parameters of a selected model framework to minimize a cost value for the selected model framework, wherein the first trained natural language model is updated using at least one of: a reinforcement learning mechanism, a feedback learning mechanism, or a retraining process; and evaluating the first trained natural language model based on an evaluation process.

11. A computer-implemented method, comprising:

receiving, from a database, training data comprising a plurality of input messages and corresponding search results;

iteratively training a natural language model based on the training data to iteratively adjust parameters and generate a first trained natural language model;

receiving an input message from a requesting device via a limited-communication channel;

identifying, via the first trained natural language model, a plurality of queries in the input message;

implementing a plurality of search threads, wherein each of the plurality of search threads is configured to generate search results for a corresponding one of the plurality of queries;

inputting each of the plurality of queries into a corresponding one of the plurality of search threads and generate the corresponding search results;

generating a responsive message comprising at least a portion of the search results for each of the corresponding one of the plurality of queries; and transmitting the responsive message to the requesting device.

12. The computer-implemented method of claim 11, wherein:

the input message comprises the plurality of queries and an operation identification; and the operation identification includes at least one of:

an express operation identification expressly indicating a multi-item search operation, or an implied operation identification implying a multi-item search operation based on interoperations between the system and the requesting device.

13. The computer-implemented method of claim 11, wherein:

each of the plurality of queries includes a query string representing at least one of: a respective item type, a respective item category, or a respective item name;

the input message includes a feature string for at least one of the plurality of queries; and the feature string modifies the at least one of the plurality of queries based on: brand, flavor, size, color, quantity, and/or ingredient.

14. The computer-implemented method of claim 11, wherein identifying the plurality of queries comprises:

identifying semantic elements within the input message;

generating embeddings for each of the semantic elements, wherein each of the embeddings includes a respective vector representation in a same vector space;

identifying the plurality of queries based on an embedding comparison between each semantic element and known queries in the same vector space; and identifying separation characters separating the plurality of queries in the input message.

15. The computer-implemented method of claim 11, further comprising:

generating a confirmation message in response to an identification of the plurality of queries, wherein the confirmation message includes an indication that the input message has been received and a multi-item search operation is being conducted; and transmitting the confirmation message to the requesting device before implementing the plurality of search threads, wherein:

the input message is received via a first protocol associated with one of: a short message/messaging service (SMS), a multimedia messaging service (MMS), a rich communications service (RCS), or an encrypted messaging service, and the confirmation message is transmitted via a second protocol different from the first protocol.

16. The computer-implemented method of claim 11, wherein:

the plurality of search threads are implemented using a trained search model;

the trained search model includes at least one of: a regression model, an Extreme Gradient Boosting (XG-Boost) model, or a lambdaRank and Multiple Additive Regression Trees (lambdaRankMART) model; and the first trained natural language model includes at least one of: a bidirectional encoder representations from transformers (BERT) model, a Robustly Optimized BERT Pretraining Approach (ROBERTa) model, or a large language model.

17. The computer-implemented method of claim 11, wherein:

each of the plurality of search threads is executed in parallel; and the plurality of search threads are executed in an asynchronous manner.

18. The computer-implemented method of claim 11, wherein generating the responsive message comprises:

filtering the search results for all of the plurality of queries to generate a filtered search result set for each query, according to at least one of: a search-specific criteria, a user-specific criteria, or a system-specific criteria;

ranking items in each filtered search result set to generate a corresponding ranked search result set for each query, based on historical user interactions and/or user defined preferences; and generating the responsive message based on a predetermined number of top-ranked items selected from each ranked search result set.

19. The computer-implemented method of claim 11, further comprising:

normalizing a training dataset;

executing an iterative training process to generate the first trained natural language model based on the normalized training dataset, by iteratively adjusting parameters of a selected model framework to minimize a cost value for the selected model framework, wherein the first trained natural language model is updated using at least one of: a reinforcement learning mechanism, a feedback learning mechanism, or a retraining process; and evaluating the first trained natural language model based on an evaluation process.

20. A non-transitory computer readable medium having instructions stored thereon, wherein the instructions, when executed by at least one processor, cause at least one device to:

receive, from a database, training data comprising a plurality of input messages and corresponding search results;

iteratively train a natural language model based on the training data to iteratively adjust parameters and generate a first trained natural language model;

receive an input message from a requesting device via a limited-communication channel;

identify, via the first trained natural language model, a plurality of queries in the input message;

implement a plurality of search threads, wherein each of the plurality of search threads is configured to generate search results for a corresponding one of the plurality of queries;

input each of the plurality of queries into a corresponding one of the plurality of search threads and generate the corresponding search results;

generate a responsive message comprising at least a portion of the search results for each of the corresponding one of the plurality of queries; and transmitting the responsive message to the requesting device.

* * * * *